(12) United States Patent
Chang et al.

(10) Patent No.: US 11,355,158 B2
(45) Date of Patent: Jun. 7, 2022

(54) ASYNCHRONOUS VIDEO COLLABORATION

(71) Applicant: Genius Sports SS, LLC, Los Angeles, CA (US)

(72) Inventors: Yu-Han Chang, South Pasadena, CA (US); Tracey Chui Ping Ho, South Pasadena, CA (US); Kevin William King, Los Angeles, CA (US); Rajiv Tharmeswaran Maheswaran, South Pasadena, CA (US)

(73) Assignee: Genius Sports SS, LLC, Los Angeles, CA (US)

( * ) Notice: Subject to any disclaimer, the term of this patent is extended or adjusted under 35 U.S.C. 154(b) by 0 days.

(21) Appl. No.: 17/320,800

(22) Filed: May 14, 2021

(65) Prior Publication Data

US 2021/0358525 A1    Nov. 18, 2021

Related U.S. Application Data

(60) Provisional application No. 63/025,730, filed on May 15, 2020.

(51) Int. Cl.
| | |
|---|---|
| *H04N 5/93* | (2006.01) |
| *G11B 27/036* | (2006.01) |
| *G06K 9/00* | (2022.01) |
| *G06F 3/0484* | (2022.01) |
| *G11B 27/00* | (2006.01) |
| *G09B 19/00* | (2006.01) |

(52) U.S. Cl.
CPC .......... *G11B 27/036* (2013.01); *G06F 3/0484* (2013.01); *G06K 9/00744* (2013.01); *G11B 27/005* (2013.01); *G09B 19/0038* (2013.01)

(58) Field of Classification Search
CPC . G06K 9/00744; G06F 3/0484; G11B 27/036; G11B 27/005; G09B 19/0038
USPC ......................... 386/278, 282, 280, 290, 326
See application file for complete search history.

(56) References Cited

U.S. PATENT DOCUMENTS

| | | | |
|---|---|---|---|
| 7,624,416 B1 * | 11/2009 | Vandermolen ......... | H04H 60/33 725/109 |
| 2013/0290874 A1 * | 10/2013 | Tan ........................ | H04N 7/141 715/756 |
| 2016/0337213 A1 * | 11/2016 | Deutsch .............. | H04L 65/4069 |

* cited by examiner

*Primary Examiner* — Robert Chevalier
(74) *Attorney, Agent, or Firm* — GTC Law Group PC & Affiliates (57) ABSTRACT

Video may be edited to include collaborations by users. Collaborations may be added to the video and associated with a span of the video. The span of the collaborations may be determined according to an action that is received from a user contemporaneously with the playback of the video. In some cases, the span of the collaborations may be determined automatically by analyzing the collaboration and the video frames to which the user initial added the collaborations. Analysis of the collaborations and video frame may be used to determine span criteria for the frames of the video that should be associated with the collaborations.

20 Claims, 7 Drawing Sheets

ASYNCHRONOUS VIDEO COLLABORATION

CROSS-REFERENCE TO RELATED APPLICATIONS

The present application claims the benefit of U.S. Patent Application Ser. No. 63/025,730, filed May 15, 2020, and entitled "ASYNCHRONOUS VIDEO COLLABORATION".

The content of the foregoing application is hereby incorporated by reference in its entirety for all purposes.

Reference is also made to U.S. Pat. No. 10,460,177, issued Oct. 29, 2019, and entitled "METHODS AND SYSTEMS OF SPATIOTEMPORAL PATTERN RECOGNITION FOR VIDEO CONTENT DEVELOPMENT" which is hereby incorporated by reference in its entirety.

BACKGROUND

Field of the Invention

The methods and systems of asynchronous collaboration relate to the technical field of interactive digital video.

Description of the Related Art

Many video platforms include functionality for users to comment on shared videos. Most commonly, user comments are uploaded in text format and associated with a particular video. In some streaming video platforms, user comments are associated with a particular time in the video, as it plays, at which the comments are received.

SUMMARY

Disclosed herein are systems and methods for asynchronous multi-modal collaboration, such as commenting, associated with a video. This collaboration may be associated with particular frames in the video, pixel locations in one or more frames in the video, as well as objects that may be linked to the one or more pixel locations. A user may be enabled to create an adapted version of a video, such as by incorporating collaborative elements such as comments in text, audio and video formatted content, graphical augmentations, links within and external to the video, changes in playback speed and direction of the video, conditional action elements that may impact playback and the like. A set of collaborative elements, which may be related to each other by time locality, spatial locality, or other common feature or theme, may be grouped together and considered as a multi-modal collaboration. Users may be enabled to share such adapted videos for use and collaboration by other users as well as respond to individual collaboration elements or to multi-modal collaboration.

In embodiments, systems and methods for asynchronous multi-modal collaboration extend the general concept of text remarks associated with the whole video, to multimedia comments associated with frames/pixels of the video, along with an interface that provides user interface elements making it easy to enter multimedia comments, navigate between comments, respond to comments, and resolve comments (each multimedia comment may consist of text, audio, video, changes in playback speed/direction and/or graphical augmentations, and the like).

In embodiments, the methods and systems of asynchronous video collaboration described herein may facilitate establishing a channel of communication between parties (e.g., a player and a remote coach) that the two parties could use for collaboration, such as by exchanging comments, augmentations, dialog, video, interactive content, and the like.

The examples in this section are merely representative of some possible embodiments but do not reflect all possible embodiments, combinations of elements, or inventions disclosed in this application. In an example, a method may include presenting, in an electronic user interface, a base video and responsive to receiving an indication of a collaboration action in the electronic user interface, identifying at least one of a frame of the base video and a region within a frame of the base video that is presented in the user interface contemporaneously with the receiving an indication. The method may further include generating a collaboration for the base video based on a type of the collaboration action and a duration of the collaboration action and producing a collaboration video that includes the base video and the generated collaboration that commences at the identified at least one of a frame of the base video and a region of a frame of the base video and lasting for a duration based on the duration of the collaboration action. In one example, the type of collaboration may be one of playback manipulation, an in-line visual insertion, a visual overlay, a visual replacement of an object identified in the region, a picture in a picture window, a visual text comment, or an audio comment. In one example, the duration of the collaboration action may be determined based on a duration of the indication of the collaboration action in the electronic user interface. In embodiments, generating a collaboration for the base video may include combining at least a portion of a second video with the base video based on the type of collaboration action. A portion of a second video may be automatically selected based on computer vision-based analysis of the region of the frame. The computer vision-based analysis may determine at least one object in the region of the base video and a corresponding object in the second video. In embodiments the method may further include replacing the at least one object in the region of the based video with the corresponding object in the second video thereby producing a collaboration video.

In an example, a method may include receiving an indication of a of a frame of a video, receiving one or more collaborations for the frame, determining collaboration elements, determining video frame elements in the frame, generating, based on the collaboration elements and the video frame elements, a span criteria for evaluating frames of the video, and searching for a span of the video for which the frames meet the span criteria. Determining the video frame elements may include searching for the collaboration elements in the frame. Determining the collaboration elements may include searching for the video frame elements in the collaborations. The collaboration elements may include at least one of words, phrases, lines, sounds, or shapes. The video frame elements include at least one of objects, people, colors, video quality, video motion, or actions. The method may further include determining a video frame element score based on a position of the elements in the frame and wherein the span criteria comprises a criteria based on the video frame element score. In some embodiments, the method may also include determining a video frame element score based on a size of the elements in the frame and wherein the span criteria comprises a criteria based on the video frame element score. The span of the video may include a gap where the frames do not meet the span criteria. The method may also include identifying keywords in the one or more collaborations, corroborating the keywords in the span based at least in part on motion of objects in the frames of the span, and generating a recommendation for a playback configuration of the span. In some cases, the recommendation may include at least one of a playback at a reduced speed, a playback at an increased speed, or a repetition of a playback of the span. Searching may include searching away from the frame and searching in one direction from the frame. In some cases, the span criteria may be different for a forward search direction and a backward search direction from the frame.

BRIEF DESCRIPTION OF THE FIGURES

The following detailed description of certain embodiments may be understood by reference to the following figures.

DETAILED DESCRIPTION

Disclosed herein are systems and methods for asynchronous multi-modal collaboration, such as commenting/annotating, associated with a video. This collaboration may be associated with particular frames in the video, pixel locations in one or more frames in the video, as well as objects that may be linked to the one or more pixel locations. A user may be enabled to create a collaboration video that may include a collaboration-adapted version of a video, such as by incorporating collaborative elements such as comments in text, audio and video formatted content, graphical augmentations, links within and external to the video, changes in playback speed and direction of the video, conditional action elements that may impact playback and the like. A set of collaborative elements, which may be related to each other by time locality, spatial locality or other common feature or theme, may be grouped together and considered as a multi-modal collaboration. Users may be enabled to share such collaboration videos for use and collaboration by other users as well as respond to individual collaboration elements, to individual multi-modal comments, or to multi-modal collaboration.

In embodiments, a multi-modal collaboration may include a comment as a particular self-contained idea as a related set of multimedia elements supporting the particular idea. For instance, in a video of a player attempting a dribbling drill where the ball is alternately dribbled by the left and right hand, the coach may add a multi-modal comment at a frame in which the ball goes too high, which consists of a graphical augmentation showing the difference between the desired location and the location in the video, and an audio explanation that the ball should not go above waist height. The coach may add another multi-modal comment at a different frame where the ball contacts the ground at the midpoint, consisting of an audio snippet complimenting the player for maintaining symmetry and a graphical augmentation illustrating the symmetry in the path of the ball.

In embodiments, a collaboration element may include an audio or video element. The audio or video element (e.g., multi-modal collaboration element or comment) may be recorded during video playback, such as while the video for which the collaboration is being recorded is playing or paused. A start point for the collaboration element may be associated with an aspect of the video, such as a starting frame, an appearance of a feature in the playback (e.g., a person, object, and the like), a count of frames from a base event, a duration of time, a timer associated with the video playback, and the like. The start point may be based on a user interaction via, for example, a user interface through which the user is viewing the video for collaboration (e.g., adapting the video for collaboration). The start point and duration over which an audio or video collaboration is recorded may be indicated by one or more user interface interactions. A start point may be determined by when a mousedown-type event is detected in the user interface (e.g., a mouse down click, a track pad down click, a keyboard key down click, an audio command, a gesture, and the like). The duration of the mousedown-type event may indicate a duration of the recording of the audio/video collaboration. Alternatively, start point (e.g., starting frame) and duration may be based on clicking a button (e.g., mouse button, touch pad, and the like) to start a collaboration by recording an audio or video collaboration and clicking a button (e.g., same button or another button) to end recording. Similarly, audio commands, gestures, and the like can be used to start and stop audio/video collaboration recording. Alternatively, an audio or video collaboration may be recorded separately (e.g., using a different system that is optionally synchronized and/or time-aligned with the target of collaboration, at a different time, and the like) and inserted using the user interface mousedown-type action to locate the inserted collaboration at a frame and the like. Alternatively, a user may choose to stop (e.g., pause) playback, indicate a video/audio collaboration to use, and adapt the video at the paused playback frame. In embodiments, an audio or video collaboration recording may run substantially continuously with the playback, wherein collaboration elements may be marked for collaboration (e.g., start/stop/duration) using, for example, the user interface methods above.

A video collaboration element may be inserted as a picture-in-picture type video element. The user interface may provide user interface elements enabling the user to adjust the position and size of the inserted video. The position may be selected by the user to be relative to an edge of the video frame, relative to a feature within the frame, relative to a pixel within the frame, and the like.

In addition to adaptive collaboration, such as by inserting/merging/overlaying/augmenting audio and/or video elements, playback may be paused through insertion of a pause collaboration. A start point (e.g., starting frame) and/or duration of a collaboration pause may be indicated similarly to video collaboration recording, such as by the duration of a user interface interaction, such as the duration of a stationary mousedown or touch hold event, or the time between clicking a button to start a pause and clicking a button to end the pause. In an example, a user may recite a verbal command, such as "Pause" to indicate a start of a pause collaboration. Likewise, the user may recite a "Resume" command to end the pause collaboration. The amount of time between the two recited commands may be coded as the length of pause of the collaboration video.

In embodiments, a starting point, speed and duration of a change in video playback (e.g., video playback speed and/or direction) may be indicated by a user interface interaction, similarly to above. Additionally, the speed, duration and direction of a mouse drag, or touch hold drag event may indicate how the playback should be changed. For instance, a slow drag to the right while touching the screen may be used to indicate a slow forward playback of the video, a drag to the left may be used to indicate a reverse playback of the video and lifting off the touch may be used to indicate a return to normal playback speed and direction. In embodiments, a user interface element such as a playback speed slider or selector may be provided to allow a user to control the playback speed of a section of video. In embodiments, gestures, such as hand movements may also be used to impact playback speed, direction, and the like.

A graphical augmentation, such as a circle, arrow or other images, may be added over the video frame at a pixel location selected by a user, for instance by clicking or touching (e.g., on a touchscreen) a pixel location in a particular frame of the video. A user interface interaction such as clicking a button may be used to toggle an augmentation on or off, or to select among available augmentation images.

Computer vision techniques, including, without limitation spatiotemporal pattern detection for determining, among other things, an event in a video, and related techniques, such as the systems and methods disclosed in U.S. Pat. No. 10,460,177, which is hereby incorporated by reference in its entirety, may be used in conjunction with the methods and systems described herein to allow a multi-modal collaboration (e.g., audio or video element, graphical element, or other augmentation) to track an object, such as an object identified at least initially at a selected pixel location, across multiple video frames, independent of any change in position relative to the selected pixel location. The duration of such an augmentation may be indicated by the duration of a user interface interaction such as the time between clicking a button to start an augmentation and clicking a button to end the augmentation. In an example, a player may collaborate with a coach on hand position for shooting a basketball using a player's video of the player shooting the basketball. The coach could use the methods and systems of multi-modal collaboration to reference a training video segment (e.g., from an automatically detected event using spatiotemporal event detection techniques as described herein and in documents incorporated herein by reference) showing a proper hand position and augment the player's video with it so that the proper hand position (e.g., from the training video segment) is effectively merged into the player's video at the relevant point spatiotemporally. In embodiments, the video portion of the proper hand position (e.g., training video segment) that encompasses the hand(s) can be augmented into the player's video aligned (e.g., spatiotemporally) with the player's hand(s) to produce, for example, a collaboration video.

Other examples of the methods and systems of asynchronous multi-modal video collaboration might include family and friends commenting on a school play or a sporting event (e.g., in which someone they know is a participant), or a film class exchanging comments on a film, such as a student film, together with the class instructor, and the like.

In embodiments, a single user interface interaction may control multiple editorial elements. For instance, a single mousedown or touch hold event at a particular frame (and optionally a pixel location) may be used to insert a graphical augmentation type multi-modal collaboration (e.g., at the selected location), pause the video and record a video comment starting at the particular frame until the mouse up or touch release event, at which time the playback of the base video is resumed.

In embodiments, the base video input may include multiple camera angles of an event. The user interface may provide elements to enable selection and switching of camera angles in the edited video. As an example, a user may perform a user interface interaction (e.g., mousedown/click and the like) to indicate that video from an alternate camera angle be augmented into the adapted video. Starting location and duration of the camera angle change may be indicated as noted above for collaboration elements. The alternate camera angle video content may replace the original video content for the specified duration in the adapted output video.

A version of the collaboration video incorporating such editorial elements inserted by a first user may be saved by the system and shared with or otherwise be made available to a second user. Using the methods and systems of asynchronous multi-modal collaboration described herein, the second user may respond to individual collaboration elements inserted by the first user, as well as to add collaboration elements.

The second user may add further collaboration elements in a similar fashion as the first user. The version of the collaboration video including one or more multi-modal collaboration elements of the first user may be used as a base video on which further collaboration elements are added by the second user.

While using the collaboration video from the first user for further collaboration, the second user may resolve a comment inserted by the first user, which may cause removal of the comment and any associated augmentations or video playback timing and direction changes inserted by the first user. In embodiments, resolving a comment during multi-user multi-modal collaboration may also or alternatively include indicating as such (e.g., adding a visual annotation) in one or more of the base collaboration videos and the second user commented video.

The second user may add a comment as a response to a comment from the first user. A comment added during playback or directly after a comment from the first user may be considered by default to be a response to the first user's comment. Alternatively, a user interface interaction such as clicking a response button associated with the first user's comment may be used to indicate that the second user's comment is a response to the first user's comment. The system may be configured such that resolving a response to a comment is used to indicate resolution of the original comment as well. During playback of a collaboration video, the playback may automatically pause contemporaneously with each multi-modal collaboration comment until a response thereto is entered in a user interface through which the collaboration video is being played. Such requirement automatic pause action and response may be configured by the user inserting the multi-modal comment.

The user interface may provide functionality enabling a user to easily navigate between collaboration elements (e.g., comments and the like) in the video. In embodiments, the system may provide user interface elements allowing a user to jump to the previous or next collaboration element, such as an unresolved comment in the video, for instance, by clicking a button or swiping left or right on a touchscreen.

In embodiments, computer vision-based techniques, such as those described herein and in U.S. Pat. No. 10,460,177, which is hereby incorporated by reference in its entirety, including computer vision-based automatic identification of certain events or actions of interest in the video may facilitate enabling a user to easily navigate between such identified events for collaboration, such as for associating comments with such events. The computer vision-based functionality may further include providing automatic comment suggestions for identified events, such as metrics or qualitative comments and the like. Additional user interface features for asynchronous multi-modal collaboration that may be enabled by, among other things, computer vision-based functionality may include functionality to easily speed up or trim out long sections of video with no actions of interest.

In embodiments, collaborative elements may include active content, such as action buttons and the like that, when activated during playback (e.g., via an interactive video playback user interface), may activate other functions, such as a chat session with the user who inserted the collaborative element, a live video session (e.g., between the viewer and the commenter) that may appear as a picture in a picture during, for example playback of the adapted video.

In embodiments, a method of asynchronous video-based collaboration may include presenting a base video in an electronic user interface. The interface may facilitate receiving an indication of a multi-modal collaboration action (e.g., an augmentation action). In response, the user interface may facilitate identifying at least one of a frame of the base video and a region within a frame of the base video that is presented in the user interface contemporaneously with the receiving an indication. The method may further include augmenting the base video based on a type of collaboration action and a duration of the collaboration action indicated in the user interface. The method may further include producing a collaboration video that includes the base video augmented via multi-modal collaboration with a multi-modal collaboration comment (e.g., a set of audio and/or video elements) that commences at the identified at least one of a frame of the base video and a region of a frame of the base video and lasting for a duration based on the duration of the collaboration action. In embodiments, the type of collaboration action may be any of playback manipulation, an in-line visual insertion, a visual overlay, a visual replacement of an object identified in the region, a picture in a picture window, a visual text comment, and an audio comment. In embodiments, the duration of the collaboration action may be determined based on a duration of the indication of the collaboration action in the electronic user interface. Yet further, performing multi-modal collaboration on the base video may include combining at least a portion of a second video (e.g., a training video) with the base video based on the type of collaboration action. The portion of a second video may be automatically selected based on computer vision-based analysis of the region of the frame. Yet further, the computer vision-based analysis may determine at least one object in the region of the base video and a corresponding object in the second video. The method may further include replacing the at least one object in the region of the based video with the corresponding object in the second video thereby producing a collaboration video.

Figure 1:
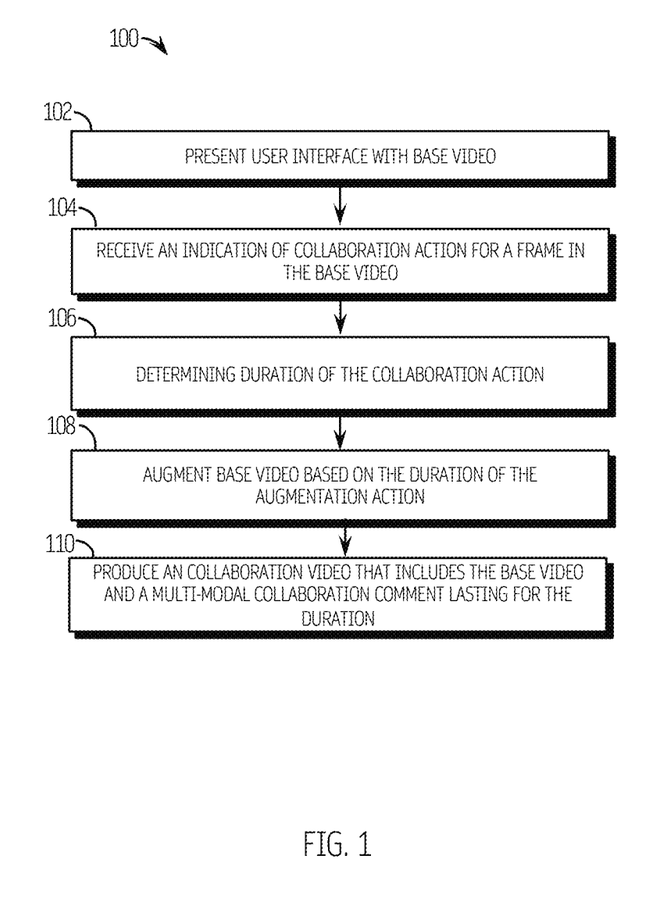
FIG. 1 depicts an exemplary flow of an embodiment of a method for adding augmentations.

FIG. 1 depicts an exemplary flow of an embodiment of a method 100 for asynchronous multi-modal collaboration. The method may include presenting a user interface with a base video 102. The method may further include receiving an indication of collaboration action for a frame in the base video 104. The indication may include a button press and hold on the interface or a peripheral device such as a keyboard or mouse. The duration of the collaboration action may be monitored 106, and the multi-modal collaboration impact of the base video may be based on or equal to the duration of the collaboration action 108. The method may further include producing a collaboration video that includes the base video and a multi-modal collaboration comment (e.g., an augmentation) lasting for the duration of the collaboration action 110.

Figure 2:
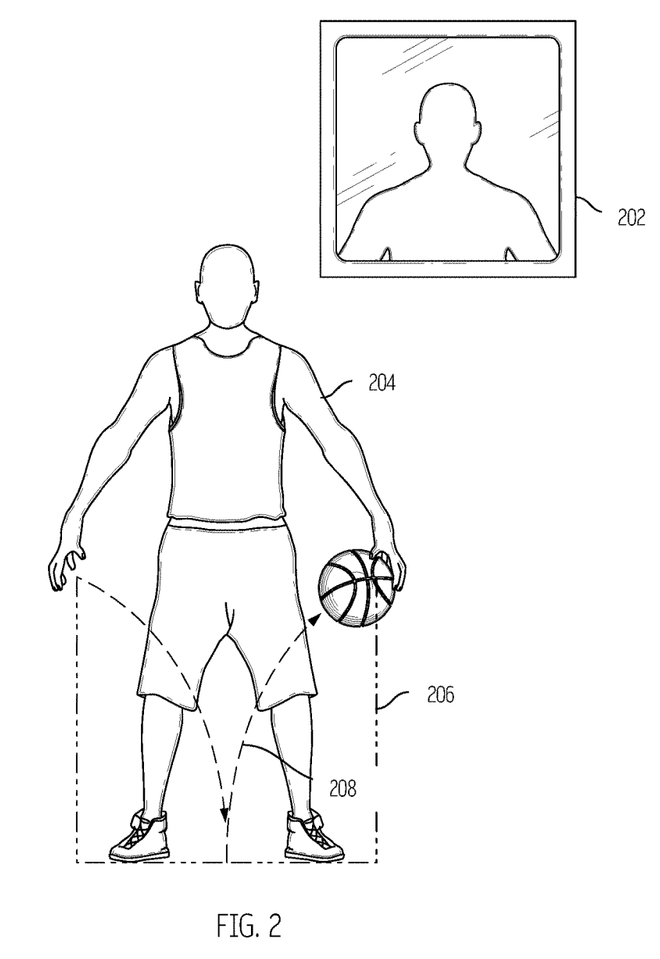
FIG. 2 depicts an exemplary multi-modal collaboration.

FIG. 2 depicts an exemplary multi-modal collaboration video. Multi-modal collaborations depicted include a picture-in-picture 202 of a video captured by a commenter and inserted as an overlay on a base video of a player 204 and using the user interface methods and systems described herein. To generate this collaboration, the commenter selected a frame in the video at which the player 204 commences or performs a dribbling drill. The commenter captured video of himself explaining to the player the proper technique for dribbling alternatively by the left and right hand. The picture-in-picture multi-modal collaboration plays synchronously with main video. A second multi-modal collaboration augmentation 206 is depicted as dotted lines added by the commenter. These may be added by the commenter and overlaid manually on the player's actions to illustrate that, for example, the player is achieving the desired width, height, and symmetry of the dribbles. A third multi-modal collaboration augmentation 208 is an arrow added by the system using, for example, one or more of the computer vision-based algorithms referenced herein that track the path of the dribbled ball.

Figure 3:
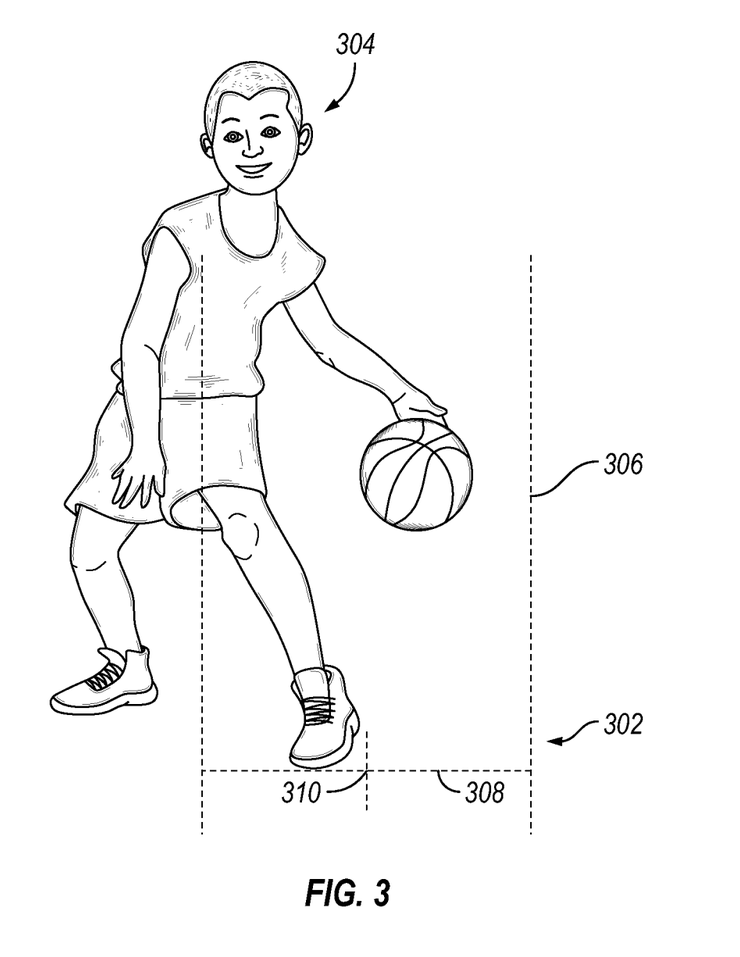
FIG. 3 depicts an alternate exemplary multi-modal collaboration.

FIG. 3 depicts an alternate exemplary multi-modal collaboration video. In FIG. 3, the collaboration comprises at least an augmentation graphic 302 that is added by a commenter and adapted automatically through one or more of the computer-vision techniques referenced herein so that it tracks the player positioning 304, vertical 306 and horizontal 308 extent of the dribble, and point of impact 310 with the floor.

In embodiments, collaboration(s) and augmentations may be associated with a portion or a span of a video. A span of a video may be a time span of the video and may be defined with a start and an end. The start and end may be defined by a starting time and an ending time, respectively. In some cases, a span of a video may relate to a number of frames of the video and may be defined based on a number or index of a starting frame and a number or index of an ending frame. A span of a video may be continuous such that all portions of the video in the span are part of the span. In some cases, a span of a video may be non-continuous such that the span may include gaps within the span. In embodiments, a span of a video may be defined using one or more time periods, time markers, frame counts, frame markers, features (such as chapters, acts, sections), time ranges, events (e.g., a dribble of a ball from a first hand to a second hand), and the like.

In embodiments, users may add collaboration(s) comments (e.g., one or more of video, audio, and augmentation elements) to video and the collaboration(s) comments may be associated with one or more frames of the video or a span of the video. In some cases, associating a multi-modal collaboration comment with a span of a video may indicate that a portion of the comment (e.g., a visual annotation) is visible during the associated span (e.g., a multi-modal collaboration augmentation). In some cases, associating a comment with a span of a video may allow the span to be searched or queried according to one or more of the elements of the multi-modal collaboration of the comment (such as words, symbols, links, sounds, etc.) of the collaboration.

A collaboration video may be generated by pausing a video or navigating to a specific frame of a video and applying one or more multi-modal collaboration elements (e.g., one or more collaboration annotation elements) to the video frame. As used herein, the frame to which collaborations may be applied may be referred to as a marked frame. The collaboration of a marked frame may be associated with a larger span of the video by manually specifying the start, end, duration, frame count, or other elements that may define a span of the video for the collaboration. Manual specification of a span of a video may be a time-consuming process. A user may need to scroll and view a video forward and backward multiple times to determine the exact start and end of a span for associating the collaboration.

In embodiments, a multi-modal collaboration annotation of video (such as indicated by a user via a user interface) may be analyzed to automatically determine one or more appropriate spans of the video for the collaboration (e.g., multi-modal collaboration annotations of a marked frame). In some cases, one or more of the automatically determined spans may be suggested to a user. In some cases, one of the spans of the video may be automatically selected, and the collaboration may be automatically associated with the selected span.

In one example, a multi-modal collaboration comment (e.g., a multi-modal collaboration annotation/element) added to and/or associated with a marked frame may be analyzed to determine one or more elements such as words, sounds, images, links in the annotation. Collaboration comments may be analyzed to identify if the comments include a reference to elements such as objects, actions, people, places, and the like. In some cases, semantic language analysis techniques may be used to identify the meaning of phrases, sentences, and the like. Any number of methods may be used to analyze the text, sounds, images, and other content of a comment to determine elements thereof. The analysis of the comments (e.g., multi-modal collaboration comments as referenced herein) may generate a list of detected elements (words, phrases, models, descriptors, etc.). The list of elements may be ranked or scored. The ranking and/or score of the elements may be representative of the importance of the detected elements. In one example, elements that occur more frequently may be assigned a higher importance score. In another example, elements that are less common may be assigned a higher importance score. In another example, the importance score of an element may depend on the author of the element, wherein some author's comments may be identified as more important and therefore assigned a higher rank. In some cases, the list of elements may be filtered to eliminate elements below a threshold score or filtered to reduce the number of elements below a maximum number of elements.

The marked frames (e.g., frames incorporating and/or associated with a multi-modal collaboration comment) may be analyzed to determine elements such as objects, people, colors, locations, and the like. In some cases, a plurality of frames (such as 10 or 20 or less) before and/or after a selected marked frame may be analyzed to determine video features in the frames and/or actions or activities that occur in the frames. Sequences of frames may be analyzed to determine the amount or percentage of pixels changed from frame to frame, motion of objects or people identified in the frames, actions performed (e.g., by people) in the frames, changes in the background, and the like. Analysis of video frames to identify objects, people, actions, image quality, colors, and the like may use any number of image and video analysis techniques, image recognition algorithms, machine learning methods, and the like, some of which are described in U.S. Pat. No. 10,460,177, which is hereby incorporated by reference in its entirety. The analysis of the frames may generate a list of elements (words, phrases, models, descriptors, etc.) for the frames. The list of elements may be ranked or scored. The ranking and/or score of the elements may be representative of the importance of the elements. In one example, scores for the elements may be related to the area of the frame that they occupy, with elements having a larger number of pixels having a larger score than smaller elements. In another example, scores for the elements may be based on their position within the frame. Elements that are closer to the center of the frame may be assigned a higher score than elements that are positioned toward the edges of the frame. In some cases, the list of elements may be filtered to eliminate elements below a threshold score or filtered to reduce the number of elements below a maximum number of elements.

The elements of the one or more multi-modal collaboration comments may be analyzed to determine if the elements of the comments match (e.g., have a detectable relationship with) any of the elements detected in the video frames associated with the comments. A list of common elements (e.g., those elements in the video and comments that have a detectable relationship) may be generated. The listing of common elements may be assigned a score that is a combination of the comment element score determined during the analysis of the comments and the video element score determined during the analysis of the video frame. The score may be an average of the two scores, a weighted sum of the two scores, and the like.

In some cases, the detection of elements in the comments and the associated video frames may occur independently such that detection may include detection of a plurality of (e.g., all) detectable elements in both the comments and the associated video frames followed by a determination of elements that are common to the comment and the video.

In some cases, the detection of elements in the multi-modal collaboration and associated video frames may be performed sequentially (e.g., multi-modal collaboration element detection followed by video frame element detection) and detected collaboration elements may be used to enhance, limit, and/or improve detection of elements in the video frames (and vice versa, e.g., detected video elements may be used to enhance, limit, and/or improve detection of collaboration elements). In one example, collaboration comments (e.g., collaboration annotations) may be first analyzed to detect a list of collaboration elements. The list of detected collaboration elements may be used as a basis for a search for elements in the video frames. That is, the detection of elements in the video frames may be based on (e.g., limited to) the elements that have been detected in the collaboration comments. Likewise, video frames may be analyzed to detect elements in the frames (e.g., first detection), followed by a search for collaboration elements (e.g., second detection) based on the detected elements in the frames. In some cases, the second detection may be limited to only the elements detected in the first detection. In some cases, the list of detected elements may be processed to expand or reduce the list. For example, the list of elements may be expanded to include similar terms (for example, element "vehicle" may be expanded to "car," "truck," "bicycle," "airplane," and the like).

In some cases, common elements may be determined by analyzing the collaborations and video frames together. In one example, collaborations may include annotations that may be lines or shapes on a frame of a video that identify relationships or emphasize objects or actions in the video frame. For example, collaboration annotations may include lines that depict a trajectory or a constraint on an object. Referring again to FIG. 2, a collaboration annotation may include one or more lines 206 that reference the elements of a frame such as the hand of a player and a ball. In embodiments, the collaboration annotation(s) may be analyzed together with the video frame to identify which objects in the frame the collaboration annotation(s) are related to. For example, objects at the end of lines of a collaboration annotation may be identified as common elements and may be used as part of the span criteria. As another example, one or more objects that are enclosed by collaboration annotation(s) (such as a circle) may be identified as one or more candidate common elements. In embodiments, the enclosing collaboration annotation(s) may be emphasizing the object in the video frame.

In embodiments, a first detection of elements (e.g., of a collaboration comment) may include and/or may be followed by an analysis of the detected elements to determine one or more categories of the elements. The detected one or more categories may be used to determine or optimize any or all of algorithms, methods, and/or signatures that may be used in a second detection of elements (e.g., of a video). For example, the first detection of elements may be the detection of elements in the collaboration comment(s). The detected elements may be referenced by terms such as "color," "contrast," and "low quality." The terms may indicate that the annotations may be referring to the quality of the video or images rather than the objects shown in the frames. The elements may fall into a video quality category. In embodiments, video quality category elements and may cause the second detection which may be the detection of elements in the video frames to use methods and algorithms tailored for detection/determination of image and/or video quality of the frames rather than objects. In another example, the detected elements in the collaboration(s) may include elements such as "running," "jumping," and "score." The elements may be determined to fall into an action or sports category and may cause the second detection to use methods and algorithms tailored for the detection of actions and motion associated with sports and may include analysis of multiple frames or changes between frames to detect motion.

Sequential detection of elements, where the second detection is determined based on the set of first detected elements, may improve the speed and computational requirements needed for performing the second detection. Limiting the scope of the second detection space may allow the use of more accurate and/or faster algorithms for detecting elements that are common with the first detected elements as opposed to algorithms and methods that have an unconstrained detection space.

In some embodiments, collaboration video content (e.g., video content which is associated with collaboration annotations) may have been previously analyzed and may be associated with a spatio-temporal index that may identify elements that may be found in the frames of the video (see, for example, systems and method described in U.S. Pat. No. 10,460,177, which is hereby incorporated by reference in its entirety). In embodiments, the spatio-temporal index may be queried for elements that pertain to the frame to which the comment was added (e.g., a marked frame). The elements from the spatio-temporal index may be used as a list of elements that may be searched for in the collaboration comment(s).

After detection of elements in the collaboration(s) and the one or more video frames associated with the collaboration(s), the list of common elements to the collaboration(s) and the one or more video frames may be used to determine a span of video for the collaboration(s).

In embodiments, the span of the video may be determined by identifying other video frames that include one or more of the common elements. In embodiments, additional frames, before and/or after the marked frame, may be analyzed to determine if they include one or more of the common elements. Additional frames may be analyzed to find the furthest frames of the video (forwards or backward from the marked frame) that include one or more of the common elements. The furthest frames that include one or more of the common elements may determine the span of the video that should be associated with the collaboration(s) for the marked one or more frames.

In embodiments, a span criteria that includes aspects of the common elements may be used to determine if a frame should be included in the span. In embodiments, frames may be evaluated to determine if they meet the span criteria. Frames may be evaluated starting from the marked frame to determine if each frame meets the span criteria. The first frame from the marked frame that does not meet the span criteria may be identified as a boundary of the span. In embodiments, various search algorithms may be used to identify the closest frame to the marked frame that does not meet the span criteria. In one example, a sequential search may be used. In a sequential search, each frame, starting with the marked frame, may be analyzed with respect to the span criteria. The frames may be sequentially analyzed until the first frame that does not meet the criteria is identified. The first frame that does not meet the span criteria may be identified as one edge of the span. The search may be executed in both directions from the marked frame or may be executed only in one direction and may depend on user settings. In the case where the search is executed in both directions from the marked frame, the first frames in each direction that do not meet the span criteria may define the span. In the case where the search is executed in one direction, the span may be defined on one end as the first frame that does not meet the criteria and the marked frame may define the other end of the span.

In embodiments, various search methods may be used to identify the first frame that does not meet the span criteria. Search methods may include sequential search, linear search, jump search, Fibonacci search, binary search, and the like. In some cases, not all of the frames in the span may be analyzed. In some cases, a search algorithm may start examining an initial frame that is not next to or adjacent to the marked frame but may be 200 or 1,000 or more frames away from the marked frame. If the initial frame meets a span criteria, the algorithm may assume that all the frames between the initial frame and the marked frame also meet the span criteria and may avoid examining all of the frames.

In one example, frames that meet the span criteria may be frames that include all of the common elements and frames that do not meet the span criteria may be frames that do not include all of the common elements. The span of the video may be defined by the furthest frames from the marked frame that include all of the common elements. In this example, all the frames in between the furthest frames and the marked frame would all include all of the common elements.

In another example, frames that meet the span criteria may be frames that include at least 50% of all of the common elements and frames that do not meet the span criteria may be frames that include less than 50% of the common elements. The span of the video may be defined by the closest frames to the marked frame that include less than 50% of the common elements.

In embodiments, different span criteria may be defined or selected based on various factors such as based on the number of common elements, scores of the common elements, the category of the common elements, length of the video, types of collaboration(s), and the like. Appropriate span criteria may be determined based on a statistical analysis of the performance of the different criteria for various collaboration(s) and videos. Once the performance analysis is determined, appropriate span criteria may be selected using a lookup table or the like.

In some embodiments, one span criteria may be used to define the span boundary in the forward direction, and another span criteria may be used to define the span boundary in the backward directions from the marked frame. In some embodiments, the span criteria may change as a function of time or distance away from the marked frame. For example, initial span criteria may generate a span that is longer than a span length threshold. The span criteria may be changed to more restrictive span criteria (such as requiring more common elements for the frames) until the span is less than the span length threshold.

In some embodiments, the span criteria may allow for gaps within the span. In some cases, the span may include frames that do not meet the span criteria. In some cases, video may include corrupted frames, title frames, changes in cameras that may disrupt the continuity of a scene. These frames or gaps in the span may be allowed in the span if they are less than a threshold, such as less than a threshold number of frames (such as 200 frames or less) and/or less than a threshold time within the span (such as 5 seconds or less).

After the span is detected in the video, the span may be automatically marked in the video, and the collaboration(s) that were associated with the marked frame may be associated with the span. In some cases, the collaboration(s) may be configured to be visible for the whole span. In some cases, the detected span and/or characteristics of the span may be presented to a user. Aspects such as the length of the span, the first and ending frames of the span, and/or the like may be shown to the user to allow the user to evaluate if the detected span is valid or appropriate. A user may accept or reject the span or indicate that the span should be reevaluated using different span criteria.

It should be appreciated that automatic or semiautomatic span determination provides for improved video collaboration not available in prior methods and systems. The methods improve the speed at which the collaboration(s) may be associated with a video and save users from having to manually search for start and end portions of a span. The methods further improve the accuracy of span identification by examining each frame individually and identifying subtle boundaries in the change of the span criteria.

Figure 4:
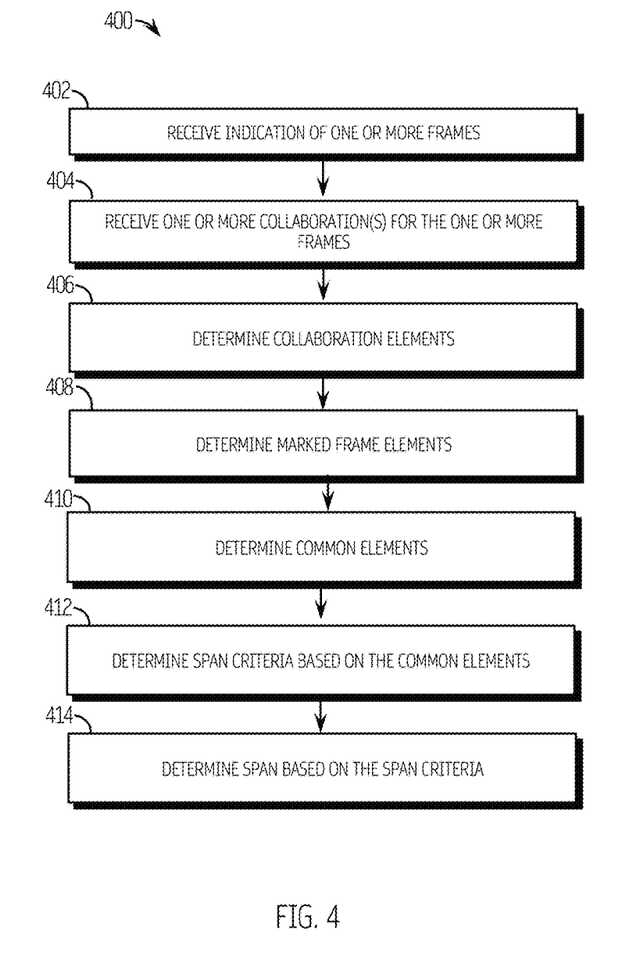
FIG. 4 depicts an exemplary flow of an embodiment of a method for automatic span detection.

FIG. 4 illustrates an exemplary flow of an embodiment of a method 400 for automatic span detection. The method may include receiving an indication of one or more frames of a video 402. The video may be paused, and a user may select a frame for editing or inserting collaboration(s). In some cases, more than one frame (which may or may not be consecutive) may be selected. The selected frames may be marked with collaboration(s). A user may insert one more collaboration(s) for the one or more marked frames 404. The collaboration(s) may include words, sounds files, images, graphics such as lines or shapes, references to external content, and the like.

Method 400 may include determining collaboration elements 406. The collaboration(s) may be analyzed to identify important words, images, relationships, and the like in the collaboration(s) using any number of image, sound, and/or natural language analysis tools. The collaboration elements may be scored and/or filtered based on their detected importance. The method may further include determining frame elements 408. Frame elements may be detected using any number of image and/or video recognition techniques. Although depicted in FIG. 4 as being sequential, steps 406 and 408 may be performed in parallel or in reverse order than depicted in the figure. In some cases, as described herein, the determination of marked frame elements may be based on or using detected collaboration elements and vice versa.

Method 400 may further include determining common elements 410 between the collaboration(s) and the marked frames. Common elements may include all the elements that are found in the collaboration(s) and the frames. The list of common elements may be scored or filtered based on the scores of the collaboration and/or frame elements.

Method 400 may further include determining span criteria based at least in part on the common elements 412. The span criteria may depend on an identified category of the common elements. The span criteria may depend on the number of common elements, the type of video, and the like. In some cases, a user may provide additional constraints for the span that may define the span criteria. For example, after the addition of collaboration(s) to a frame, a user may specify the maximum or expected span length. A user may specify a range of time for the expected span (such as between 3 and 5 seconds). In embodiments, the criteria may be defined or refined based on the user-defined span length. Using one or more span criteria, method 400 may include determining a span for the collaboration(s). Video frames may be evaluated using the span criteria to identify the first frames that do not meet the span criteria. The frames that do not meet the span criteria may define the start or end of the span. The characteristics of the span and/or the span may be shown to a user for approval. A user may specify of the collaboration(s) should be shown (such as an overlay) for the whole detected span, part of the span, or not shown at all but only associated with the span (such as metadata).

Figure 5:
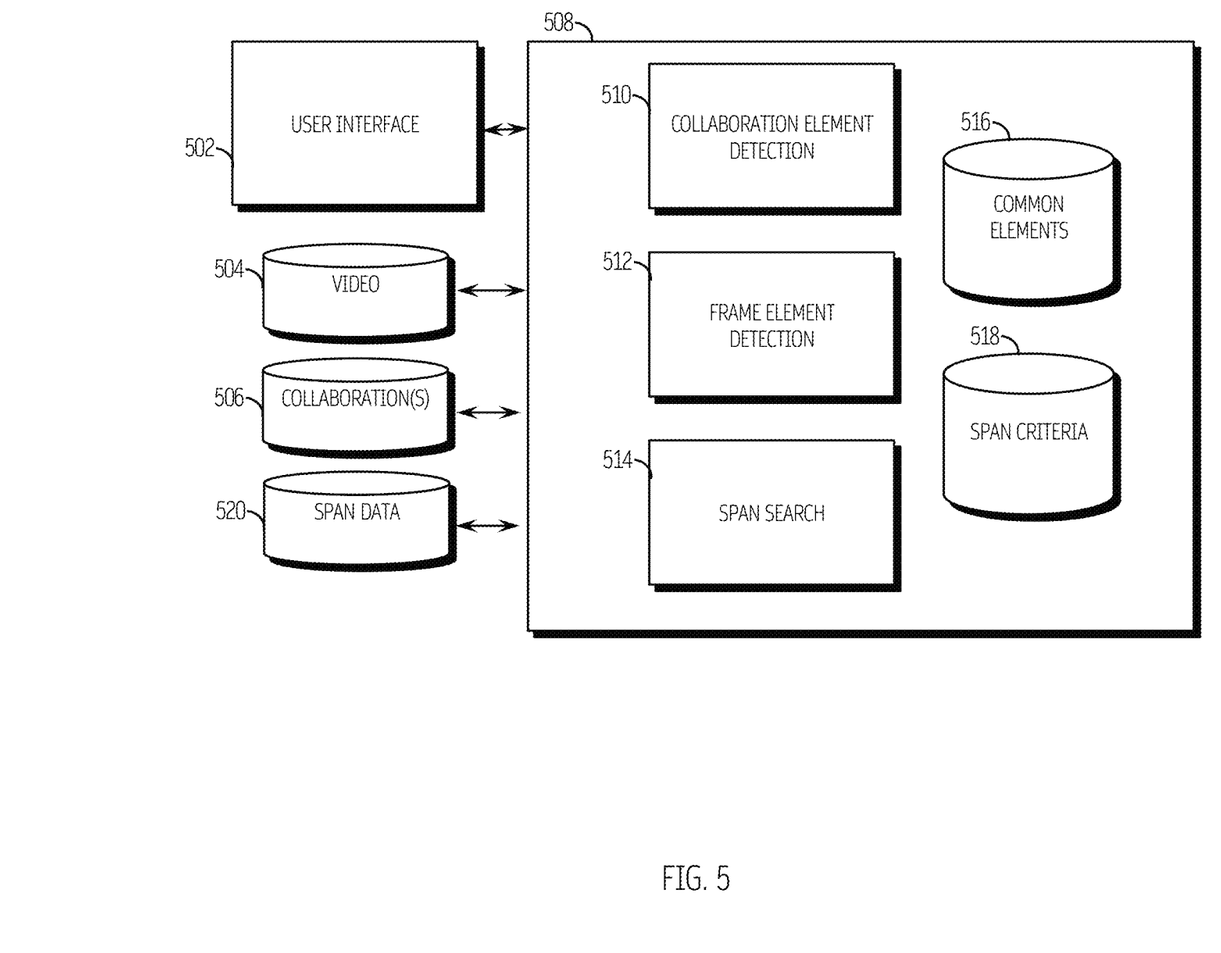
FIG. 5 depicts a system diagram of a collaboration span determining embodiment.

FIG. 5 illustrates a system diagram of a collaboration span determining embodiment. In embodiments, the system may include a span detection module 508. The span detection module 508 may receive inputs and provide outputs to a user via a user interface 502, which may be an application or a web interface. The span detection module may interface with one or more external resources such as a video database 504 and a collaboration(s) database 506 that are generated by the user. In some cases, the video and collaboration(s) databases may be the same resource. The span detection module 508 may receive collaboration(s) 506 and process the collaboration(s) using a collaboration element detection component 510. The collaboration detection component 510 includes circuits and/or software for identifying and/or scoring elements in the collaboration(s). Component 510 may include one or more circuits and/or algorithms for natural language processing, image recognition, audio recognition, and the like. The span detection module 508 may further receive video data 504 and process the video data using a frame element detection component 512. The frame element detection module 512 may process one or more marked frames associated with the collaboration(s) to identify a list of elements that may be found in the frames. Component

512 may include one or more circuits and/or algorithms for natural language processing, image recognition, audio recognition, and the like.

The span detection module 508 may further identify common elements 516 that are found in both the collaboration(s) and the frames. Based on the common elements 516, module 508 may be configured to identify span criteria for evaluating if frames of a video should be included in a collaboration span. The span detection module 508 may include a span search component 514 configured to identify frames that match the span criteria 518. The span search component 514 may include one or more circuits and/or algorithms for searching and evaluating frames against the span criteria. The span search module 514 may identify span data 520 for the collaboration(s) 506, which may be provided to a user via the user interface 502 for evaluation.

Figure 6:
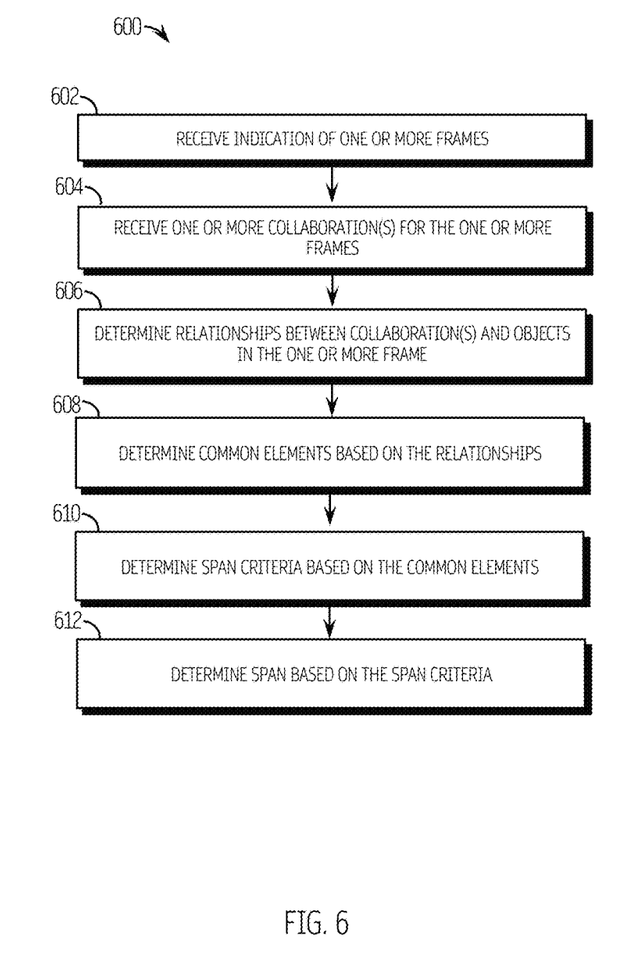
FIG. 6 depicts an exemplary flow of an embodiment of a method for automatic span detection.

FIG. 6 illustrates an exemplary flow of an embodiment of another method 600 for automatic span detection. Method 600 may include receiving an indication of one or more frames of a video 602, and collaboration(s) may be added to the one or more frames 604. The collaboration(s) may include lines or shapes that are drawn or positioned over the one or more frames. Method 600 may include determining relationships between the collaboration(s) and objects of the one or more frames 606. The collaboration(s) may be analyzed to determine the type of shapes that are in the collaboration(s) and how the shapes relate to objects visible in the one or more frames. Based on the relationships among the collaboration shapes and objects in the frame, a list of common elements may be determined 608. For example, for a shape such as a line, method 600 may identify the endpoints of the line to determine if there are objects at the ends of the line, which may indicate that the line is a connector between the two objects. The objects at the ends of the line may be identified as common elements. In some embodiments relationships such as the separation between the common elements, their position in the frame may also be captured and included with the list of common elements.

In another example, for a shape such as a line, method 600 may identify that the line is drawn between two or more objects on the frame. The line may be interpreted as a separator between the objects. The objects and their spacing, position, and the like may be captured in the list of common elements. In yet another example, for a shape such as a circle, method 600 may identify that the circle is drawn to emphasize one or more objects visible in the marked frame. The objects inside the circle, as well as their position on the frame, may be captured in the list of common elements.

Method 600 may further include determining a span criteria based on the identified common elements 610. The span criteria may include criteria such as the minimum number of the common elements that should be included in the frames in order for the frames to be considered to be included in a collaboration span. The span criteria may include criteria for the position of the common elements and the like. Using the span criteria, method 600 may determine frames around the marked frame that match the span criteria, and a span for the collaboration(s) may be determined 612 based on the closest frames to the marked frame that do not meet the span criteria.

The determined span may be provided to a user for consideration and approval. The collaboration(s) may be associated with the determined span, and the collaboration(s) may be configured to be visible for the whole determined span. In some cases, the position of the collaboration(s) may be modified for different frames of the span based on the initially identified relationships between the collaboration(s) and objects in the frame determined in step 606. The length, position, orientation, size, and the like of the collaboration(s) may be modified within the span. For example, for a collaboration such as a line that was determined to connect to objects in a frame, the line may be extended or rotated in different frames as the position of the objects changes between frames to ensure the collaboration shows the connection between the objects in the whole span.

In embodiments, after a span is for a collaboration is identified, the system may suggest or configure different playback options for the span. Spans of video, or parts thereof, may be played at different speeds such as at a reduced speed or slow motion, at an increased speed, may be played multiple times in a loop, and the like. The playback configuration may be automatically determined based on one or more of the collaboration(s), common elements, span characteristics (length of span), or video characteristics of the video (video quality, motion/activity of the video in the span, etc.).

Collaboration(s) associated with a video span may be analyzed to identify collaboration(s) that may indicate there is something important or subtle within the span. For example, collaboration(s) that include words such as "watch closely" or "how did that happen" may indicate that something in the span was important but perhaps difficult to see. Collaboration(s) may be analyzed to identify one or more keywords or key phrases that have been previously identified as indicating a subtle event within the video span. In some embodiments, the identification of one or more keywords may be further corroborated with analysis of the video in the span. The video may be analyzed to determine if the video includes fast motion or quick changes or movement of elements between the frames which may indicate that the span may benefit from a slow-motion playback or multiple playbacks. The characteristics of the video and collaboration(s) may be scored according to the likelihood that a user may accept a recommendation to adjust the playback of the span. The score may include a composite score of scores of the collaboration keywords, video characteristics, span characteristics, and the like. Based on the score, a user may be provided a recommendation to decrease the playback speed of the span or repeat the playback of the span.

Collaboration(s) associated with a video span may be analyzed to identify collaboration(s) that may indicate that the video in the frame is repetitive or too long. For example, collaboration(s) that include words such as "this is too long" or "this is repetitive" may indicate that the span includes video that may benefit from being sped up or configured for increased speed during playback. Collaboration(s) may be analyzed to identify one or more keywords or key phrases that have been previously identified as indicating repetitive or slow activity. In some embodiments, the identification of one or more keywords may be further corroborated with analysis of the video in the span. The video may be analyzed to determine if the video includes repetitive sequences of frames and/or low activity or motion. The characteristics of the video and collaboration(s) may be scored according to the likelihood that a user may accept a recommendation to adjust the playback of the span. The score may include a composite score of scores of the collaboration keywords, video characteristics, span characteristics, and the like. Based on the score, a user may be provided a recommendation to increase the playback speed of the span.

Figure 7:
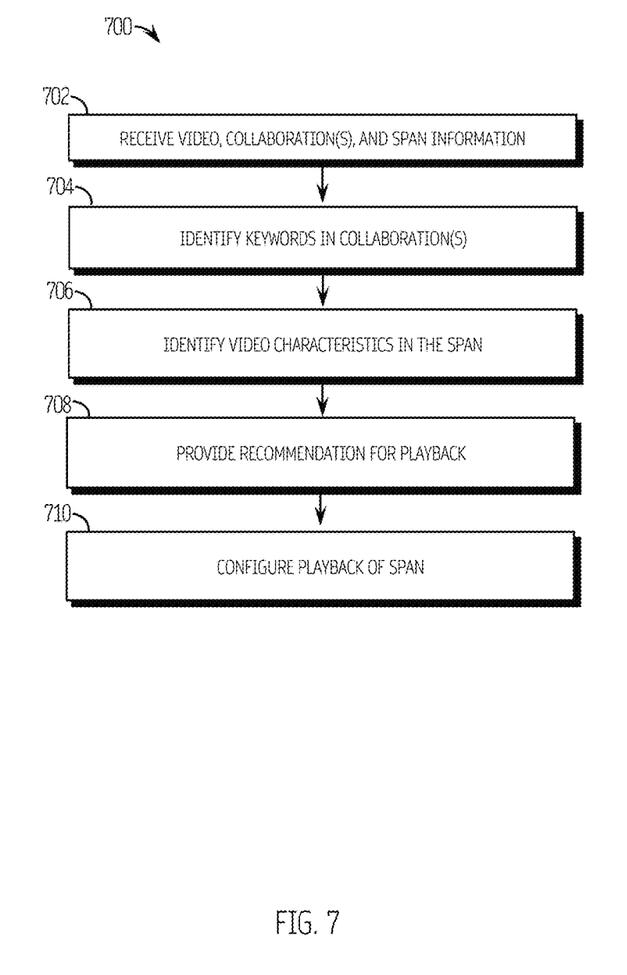
FIG. 7 depicts an exemplary flow of an embodiment of a method 700 for automatic playback configuration.

FIG. 7 illustrates an exemplary flow of an embodiment of a method 700 for automatic playback configuration. The method may include receiving or accessing the video, collaboration(s), and span information for the collaboration(s) 702. In some cases, video, collaboration(s), and span information may all be part of a video file. Method 700 may further include identifying keywords or phrases in the collaboration(s) 704. The keywords may be determined from a table lookup of lists of words and/or phrases that may correspond to complex or repetitive events in the video that may benefit from a change in playback configuration. In some cases, the keywords may identify complex behavior and may be associated with a reduced speed playback configuration and/or a repetition of playback of the span. In some cases, the keywords may identify repetitive behavior in the video and be associated with an increased speed playback configuration of the span. The method may further optionally include analysis of the video characteristic of the span 706. The video analysis may include determining if the determined keywords may be corroborated with the video characteristics. In embodiments, the amount of motion, repetition of events, the similarity of frames, and the like may be analyzed and compared to the characteristics associated with the determined keywords. Characteristics of the video that indicate fast motion may corroborate keywords that indicate that the span would benefit from reduced speed playback. Characteristics of the video that indicate slow or repetitive motion may corroborate keywords that indicate that the span would benefit from increased speed playback.

Method 700 may further include providing a playback configuration recommendation for playback of the received span 708. Based on indications from the user, the span may be configured to playback 710 with a reduced speed, increased speed, or repetitions.

In embodiments, a collaboration video may include interfaces to allow users to view a list of collaboration(s), one or more locations of collaboration, and/or navigate between/among collaboration(s) of the video. In one example, the interface may include an area where the video is visible and another area that includes a list of the collaboration(s). The list of collaboration(s) may include a snippet of the collaboration and a location, such as a time marker, where the collaboration starts. In some cases, each collaboration in the list may include interface features allowing a user to navigate to the location of the collaboration. In some cases, the listing of the collaboration(s) may include a link or a button that allows the user to navigate to the location or frame to which the collaboration was added. In some cases, the listing of the collaboration(s) may include a link or a button that allows the user to navigate to the beginning of the collaboration span.

In some embodiments, a video may be annotated by multiple users, wherein different or the same portions of the video may be annotated by different users concurrently. In embodiments, a collaboration interface may include a stream of collaboration(s) as they are added by other annotators. The list of collaboration(s) may be ordered or searchable according to the author, date added, type, determined span length, keywords, elements, and the like. Users may specify filters to receive indications and alerts when collaboration(s) matching specific criteria are added to the video.

In embodiments, different parts of a base video may be assigned to different users for annotation. In some cases, the assignment of video parts for collaboration may be based on the expertise of the collaborators. In one example, a video of a basketball may be assigned to two collaborators. The video may include video portions with basketball play and video portions with commentators discussing aspects of the game. The video may switch between the view of the game action and commentators. A first collaborator may be more familiar with providing multi-modal collaboration comments on gameplay, while a second collaborator may be more familiar with providing multi-modal collaboration comments on commentator footage. In embodiments, portions of the video that include commentator footage may be marked or extracted and assigned to the second collaborator, and portions that include gameplay may be marked or extracted and assigned to the first collaborator. In embodiments, collaborators may be associated with profiles that include one or more elements, categories or elements, actions, and the like of a video. Video may be analyzed to identify elements, and portions of the video in which elements match the profiles of the collaborators may be identified, and the particular collaborators may be assigned to the specific portions of the video.

In another example, the assignment of portions of video may be include division of the video such that each collaborator has equal work. For some videos, equal collaboration work may not correspond to equal time spans of the video since some portions of a video may require more time-consuming collaboration(s) than others. In embodiments, the number of collaboration(s) and/or time for collaboration(s) may be tracked and analyzed with respect to the elements or features of the video. Based on the analysis, a cost function may be derived that assigns a relative workload with types of video. A cost function may be a multiplier that can be used to multiply the time span of the section to obtain a normalized work score for the section. Portions of the video may be assigned to different collaborators based on the normalized score.

The methods and systems described herein may be deployed in part or in whole through a machine that executes computer software, program codes, and/or instructions on a processor. The processor may be part of a server, client, network infrastructure, mobile computing platform, stationary computing platform, or other computing platforms. A processor may be any kind of computational or processing device capable of executing program instructions, codes, binary instructions, and the like. The processor may be or include a signal processor, digital processor, embedded processor, microprocessor, or any variant such as a co-processor (math co-processor, graphic co-processor, communication co-processor and the like) and the like that may directly or indirectly facilitate execution of program code or program instructions stored thereon. In addition, the processor may enable the execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, Internet server, intranet server and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, Internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications networks. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It may further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the methods and systems described herein have been disclosed in connection with certain preferred embodiments shown and described in detail, various modifications and improvements thereon may become readily apparent to those skilled in the art. Accordingly, the spirit and scope of the methods and systems described herein are not to be limited by the foregoing examples but is to be understood in the broadest sense allowable by law.

All documents referenced herein are hereby incorporated by reference in their entirety.

What is claimed is:

1. A method comprising:
   presenting, in an electronic user interface, a base video;
   responsive to receiving an indication of a collaboration action in the electronic user interface, identifying at least one of a frame of the base video and a region within the frame of the base video that is presented in the user interface contemporaneously with receiving the indication;
   generating a collaboration for the base video based on a type of the collaboration action and a duration of the collaboration action; and
   producing a collaboration video that includes the base video and the generated collaboration that commences at the identified at least one of the frame of the base video and the region of the frame of the base video and lasting for a duration based on the duration of the collaboration action.

2. The method of claim 1, wherein the type of collaboration is one of playback manipulation, an in-line visual insertion, a visual overlay, a visual replacement of an object identified in the region, a picture in a picture window, a visual text comment, or an audio comment.

3. The method of claim 1, wherein the duration of the collaboration action is determined based on a duration of the indication of the collaboration action in the electronic user interface.

4. The method of claim 1, wherein generating the collaboration for the base video includes combining at least a portion of a second video with the base video based on the type of collaboration action.

5. The method of claim 4, wherein the portion of the second video is automatically selected based on computer vision-based analysis of the region of the frame.

6. The method of claim 5, wherein the computer vision-based analysis determines at least one object in the region of the base video and a corresponding object in the second video.

7. The method of claim 6, further include replacing the at least one object in the region of the base video with the corresponding object in the second video thereby producing a collaboration video.

8. A method comprising:
receiving an indication of a of a frame of a video;
receiving one or more collaborations for the frame;
determining collaboration elements;
determining video frame elements in the frame;
generating, based on the collaboration elements and the video frame elements, a span criteria for evaluating frames of the video; and
searching for a span of the video for which the frames meet the span criteria.

9. The method of claim 8, wherein determining the video frame elements comprises searching for the collaboration elements in the frame.

10. The method of claim 8, wherein determining the collaboration elements comprises searching for the video frame elements in the one or more collaborations.

11. The method of claim 8, wherein the collaboration elements include at least one of words, phrases, lines, sounds, or shapes.

12. The method of claim 8, wherein the video frame elements include at least one of objects, people, colors, video quality, video motion, or actions.

13. The method of claim 8, further comprising determining a video frame element score based on a position of the video frame elements in the frame and wherein the span criteria comprises a criteria based on the video frame element score.

14. The method of claim 8, further comprising determining a video frame element score based on a size of the video frame elements in the frame and wherein the span criteria comprises a criteria based on the video frame element score.

15. The method of claim 8, wherein the span of the video includes a gap where the frames do not meet the span criteria.

16. The method of claim 8, further comprising:
identifying keywords in the one or more collaborations;
corroborating the keywords in the span based at least in part on motion of objects in the frames of the span; and
generating a recommendation for a playback configuration of the span.

17. The method of claim 16, wherein the recommendation includes at least one of a playback at a reduced speed, a playback at an increased speed, or a repetition of a playback of the span.

18. The method of claim 8, wherein searching includes searching away from the frame.

19. The method of claim 8, wherein searching includes searching in one direction from the frame.

20. The method of claim 18, wherein the span criteria is different for a forward search direction and a backward search direction from the frame.

* * * * *

UNITED STATES PATENT AND TRADEMARK OFFICE
CERTIFICATE OF CORRECTION

PATENT NO. : 11,355,158 B2
APPLICATION NO. : 17/320800
DATED : June 7, 2022
INVENTOR(S) : Yu-Han Chang et al.

It is certified that error appears in the above-identified patent and that said Letters Patent is hereby corrected as shown below:

In the Specification

Column 2, Line 44, delete "of a of a" and insert -- of a --, therefor.

In the Claims

Column 23, Line 6, in Claim 8, delete "of a of a" and insert -- of a --, therefor.

Signed and Sealed this
Thirty-first Day of January, 2023

Katherine Kelly Vidal
*Director of the United States Patent and Trademark Office*